US012516785B1

(12) United States Patent
Patterson et al.

(10) Patent No.: US 12,516,785 B1
(45) Date of Patent: Jan. 6, 2026

(54) MODULAR LIGHT FIXTURE COVERING AND CONNECTING SYSTEM

(71) Applicant: Insight Lighting, Inc., Rio Rancho, NM (US)

(72) Inventors: Jaxon Patterson, Rio Rancho, NM (US); Geoffry Patterson, Rio Rancho, NM (US)

(73) Assignee: INSIGHT LIGHTING, INC., Rio Rancho, NM (US)

(*) Notice: Subject to any disclaimer, the term of this patent is extended or adjusted under 35 U.S.C. 154(b) by 162 days.

(21) Appl. No.: 18/630,305

(22) Filed: Apr. 9, 2024

(51) Int. Cl.

| | |
|---|---|
| ***F21S 2/00*** | (2016.01) |
| ***F21V 17/06*** | (2006.01) |
| ***F21V 21/005*** | (2006.01) |
| ***F21V 23/00*** | (2015.01) |
| ***F21V 23/06*** | (2006.01) |

(52) U.S. Cl.
CPC .............. *F21S 2/005* (2013.01); *F21V 17/06* (2013.01); *F21V 21/005* (2013.01); *F21V 23/002* (2013.01); *F21V 23/06* (2013.01)

(58) Field of Classification Search
CPC ........ F21S 2/005; F21V 17/06; F21V 21/005; F21V 23/002; F21V 23/06
See application file for complete search history.

(56) References Cited

U.S. PATENT DOCUMENTS

| | | | | |
|---|---|---|---|---|
| 8,454,193 | B2 * | 6/2013 | Simon | F21K 9/27 362/221 |
| 8,678,610 | B2 * | 3/2014 | Simon | F21K 9/272 362/217.08 |
| 10,302,292 | B2 * | 5/2019 | May | H01R 13/6273 |
| 2010/0328953 | A1 * | 12/2010 | Wu | F21S 4/10 362/249.14 |
| 2011/0090680 | A1 * | 4/2011 | Steinkraus | F21S 4/28 362/217.05 |
| 2011/0115381 | A1 * | 5/2011 | Carlin | F21K 9/27 315/294 |
| 2013/0182422 | A1 * | 7/2013 | Guilmette | F21V 21/30 362/217.05 |

* cited by examiner

*Primary Examiner* — Mary Ellen Bowman
(74) *Attorney, Agent, or Firm* — Rod D. Baker

(57) ABSTRACT

A system for aesthetically connecting modular light fixtures. The system includes components for interconnecting fixture modules while improving the aesthetics of the connections. A light fixture has a module body with two portions defining, by partially surrounding, a first junction space and a second junction space. The first junction space has a first cable coupler therein and the second junction space has a second cable coupler therein. The cable couplers are used to connect a module to an electrical power source, or to electrically interconnect two or more modules. The system includes a cover assembly connectable to a module body to at least partially enclose the first junction space, and/or a shroud assembly connectable to the other end of the module body to at least partially enclose the second junction space. Fastener components in the cover assembly and shroud assembly facilitate mechanical connections between two or more modules.

21 Claims, 6 Drawing Sheets

MODULAR LIGHT FIXTURE COVERING AND CONNECTING SYSTEM

BACKGROUND OF THE INVENTION

Field of the Invention

This invention relates to lighting fixtures, particularly to modular lighting systems, and specifically a system for aesthetically covering and/or connecting light fixture modules.

Background of the Invention

There are in use modular lighting systems, typically featuring the use of light emitting diodes (LEDs) disposed in rows or arrays in modular components, whereby a module contains LEDs for emitting light to the ambient environment, such as the interior of a room of a residence or a workspace. One kind of modular system includes lighting module bodies that can be interconnected physically and electrically to compose a series of modules to build a multi-module lighting system. While one individual lighting module body may be powered to provide light, it is desirable that a plurality of module bodies be selectively and functionally interconnected in a "plug and play" manner to configure planned and efficient modular lighting systems. It is preferable that the points of junction at the end(s) of a given single module body be covered when not used to make a connection. It is also desirable that the junction between two interconnected lighting module bodies in a complex system (e.g., a plurality of module bodies) be accomplished in a manner that is both aesthetic and protective of the connection. The present invention is devised to meet the need for effective and aesthetic junctions and covers in modular lighting systems.

SUMMARY OF THE INVENTION

There is disclosed a system for connecting modular light fixtures, the system including components for connecting fixture modules while improving the aesthetics of the connections. A modular light fixture has a module body with two shaped portions that together define, by partially surrounding, a first junction space and a second junction space. The first junction space has a first cable coupler therein and the second junction space has a second cable coupler therein. The cable couplers are used to connect a module to an electrical power source, and/or to electrically interconnect two or more modules. The system and apparatus of the invention include a cover assembly connectable to the at least one module body to at least partially enclose the first junction space, and/or a shroud assembly connectable to the at least one module body to at least partially enclose the second junction space. A system may include a plurality of cover assemblies and a plurality of shroud assemblies having utility to mechanically connect a plurality of modules and to aesthetically cover or camouflage the cable couplers which electrically connect adjacent modules. The cover assemblies and shroud assemblies are specially dimensioned to provide custom coverage of the respective junction spaces. The cover assemblies and shroud assemblies may be assembled from particular and respective cover and shroud components and plates, as well as specialized pegs for facilitating mechanical connections between adjacent modules.

This summary is not intended to be limiting; resort to the claims may be had for that purpose.

BRIEF DESCRIPTION OF THE DRAWINGS

The attached drawings, which form part of this disclosure but are not intended to be limiting, are as follows.

Similar elements are labeled with like numerals in the several views; the drawings are not necessarily to scale, within a view or relative to each other.

DETAILED DESCRIPTION OF THE INVENTION

This invention relates to light fixtures, particularly elongated luminaires, including but not necessarily limited to luminaires featuring light emitting diodes (LED) as efficient and controllable light sources. More specifically, there is provided by this disclosure systems and apparatus for facilitating aesthetic and protective covers and connections for the luminaire bodies of a modular "plug-and-play" lighting system. Modes and manners of covering junction points on individual lighting module bodies, and for covering and protecting the juncture between adjacently connected module bodies, are disclosed.

Figure 1:
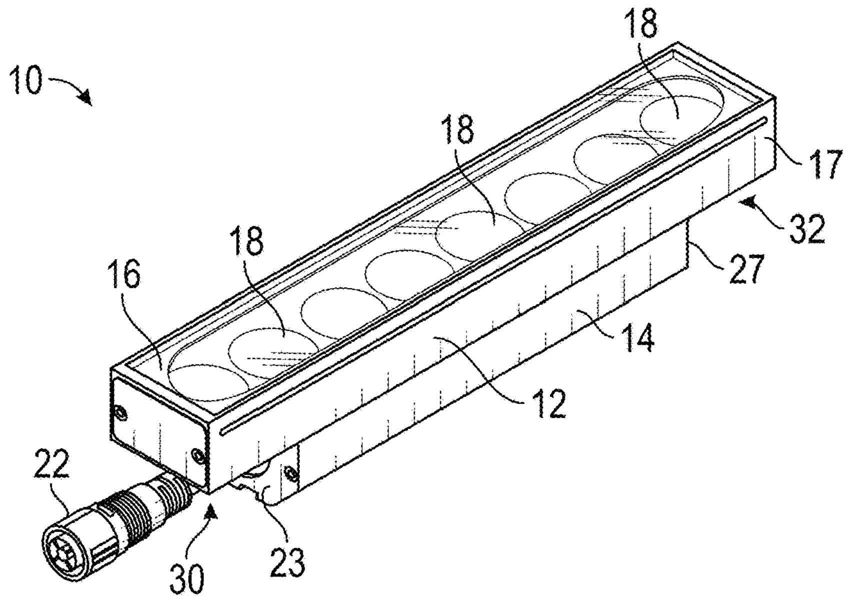
FIG. 1 is a perspective view of a known light fixture module useable with the present invention.
Figure 2:
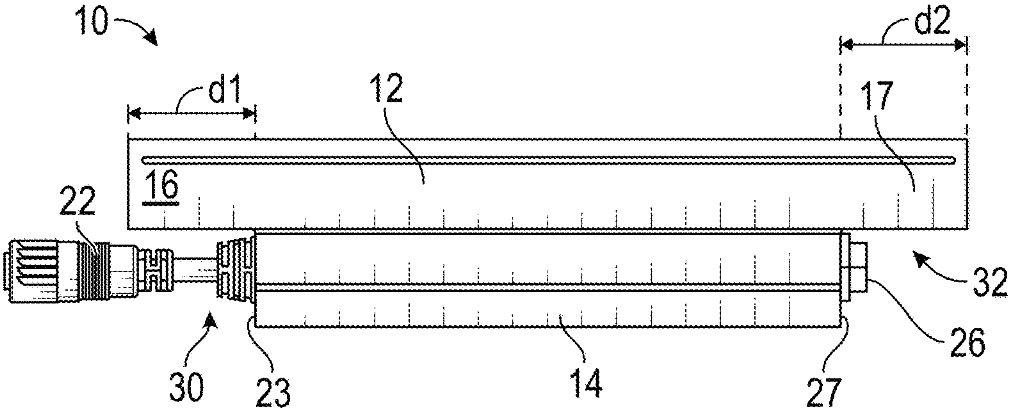
FIG. 2 is a side elevation view of the known light fixture module seen in FIG. 1.

FIGS. 1 and 2 illustrate an example of an elongated luminaire module body 10 suitable for the present invention. While the it is contemplated that the invention finds beneficial use in lighting configurations including two or more luminaire module bodies, aspects of the invention may be applied to use on a single module body 10. A plurality of module bodies such as the module body 10 of FIGS. 1 and 2 may be connected functionally together, end to end, in a modularly configured lighting system. A modular lighting system including at least one elongated module body 10 is within the scope of the present invention, with each of the at least one module bodies preferably but not necessarily being substantially similar to other module bodies in the arranged system; a series lighting system thus may include a first module body 10 with a first end and a second end, and a second module body 10 with a first end and a second end, with the pair of modules connected together (e.g., end-to-end). A series of interconnected modules thus may be architecturally adapted to provide a planned lighting system to any of a wide variety of indoor or outdoor environmental contexts, including but not limited to the rooms, hallways, storage areas, and workspaces of residential homes, commercial and industrial facilities, etc.

A light fixture module body 10 normally is elongated in overall shape and has an overall housing including two portions of different axial length, the portions being a first module portion 12 and a second module portion 14; the second module portion 14 preferably is parallelly adjacent to the first module portion, the portions 12 and 14 being fixed together. The housing composed by the two portions may be integral, or assembled of separate components. FIGS. 1 and 2 show that the first module portion 12 is longer than the second module portion 14, so that its opposite ends extend beyond the opposite ends of the second module portion. Very preferably, but not necessarily, the second module portion 14 is centered along the axial length of the first module portion 12 so that the ends of the first module portion 12 extend an equal distance beyond the respective ends of the second module portion 14. The first module portion 12 and second module portion 14 are composed of any suitable alloys, composites, or polymers, or combinations of these, as known in the art. The first module portion 12 typically houses the light source(s) and optical elements for the module; presently preferred are a series of optical elements 18. Each optical element 18 includes a light source—preferably at least one LED—and, as known in the art, any optionally desired and/or necessary auxiliary optics such as lens(es), diffuser(s), and the like for achieving the desired light emission characteristic, as well as a pane cover if needed. In the drawings, the first module portion 12 is positioned above the second module portion 14, but this is for convenience of illustration only. When the lighting module 10 is in use, which of the module portions 12, 14 is above the other depends on whether the emitted light is to be transmitted upward or downward. Moreover, the module body 10 can be positioned vertically for sidewise light transmission, or potentially may be oriented in nearly any other position in 3-D space to direct the light wherever desired.

Figure 3:
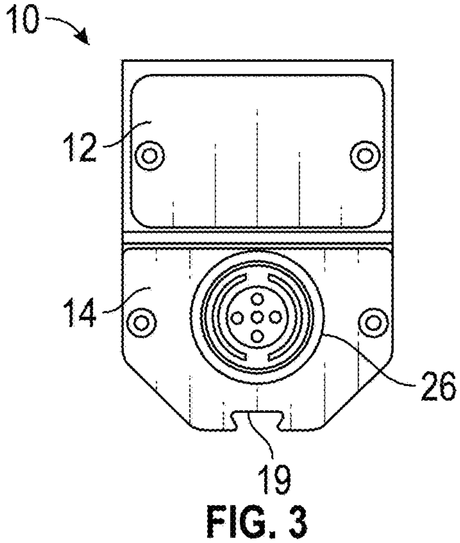
FIG. 3 is an end view of the right end of the light fixture module seen in FIG. 2.

Continued reference is made to FIGS. 1 and 2. The second module portion 14 has a first cable coupler 22 at a first end 23 thereof, and a second cable coupler 26 in a second end 27 thereof. The first cable coupler 22 typically is an electrical cable, known in the art, with any suitable electrical coupling (e.g., male adapter) on its end. The first cable coupler 22 is useable to connect the module body 10 to the source electrical circuit or to another adjacent module. As seen in FIGS. 2 and 3, the second cable coupler 26 at or in the second end 27 of the second module portion 14 is a feature (e.g., a female adapter or socket known in the art) devised to receive an electrical plug (such as coupler 22) for powering the module body 10. It is readily understood that in a plug-and-play modular system according to the present invention, the first cable coupler 22 and second cable coupler 26 are functionally complementary, namely, a first cable coupler 22 is engageable with a second cable coupler 26 to connect electrically a first module body 10 to a second adjacently positioned module body 10.

The figures also depict that the first module portion 12 has a first protuberance 16 extending longitudinally beyond the first end 23 of the second module portion 14, and a second protuberance 17 extending longitudinally beyond the second end 27 of the second module portion. In FIGS. 1 and 2 a first junction space 30 thus is defined in part by and between the first protuberance 16 and the first end 23 of the second module portion 14. Similarly, a second junction space 32 is defined in part by and between the second protuberance 17 and the second end 27 of the second module portion 14.

A problem to be solved by the present invention is the need to cover the first and second junction spaces 30, 32 when one or more module bodies 10 is in use. Covering either or both the first junction space 30 and the second junction space 32 is desirable for the protection of the first and second cable couplers 22, 26. Again, the second cable coupler 26 may be an electrical connection inlet (FIG. 3) situated in the second end 27 of the second module portion of the module body 10. Covering either of the cable couplers 22, 26 affords protection against the entry of debris, dust, splashed liquids, and other contaminations and detritus onto/into the cable couplers 22, 26. Foreign matter on or into the cable couplers 22, 26 can potentially impede coupling functions. Covering the cable couplers 22, 26 also can reduce or prevent accidental damage to, or deliberate human tampering with, the cable couplers. An additional but related problem addressed by the present invention is the comparative unsightliness of exposed cable couplers 22, 26 (as seen, e.g., in FIGS. 1-3). Covering the cable couplers 22, 26 (in whole or in part) enhances the aesthetic appearance of one or more module bodies 10 while in use.

Figure 4:
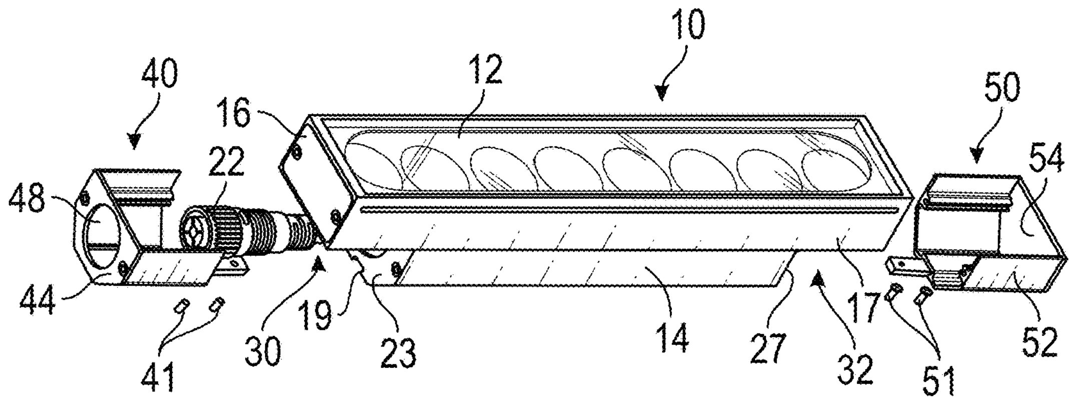
FIG. 4 is an exploded perspective view of a light fixture module, with a cover assembly and a shroud assembly, according to the present invention.
Figure 5:
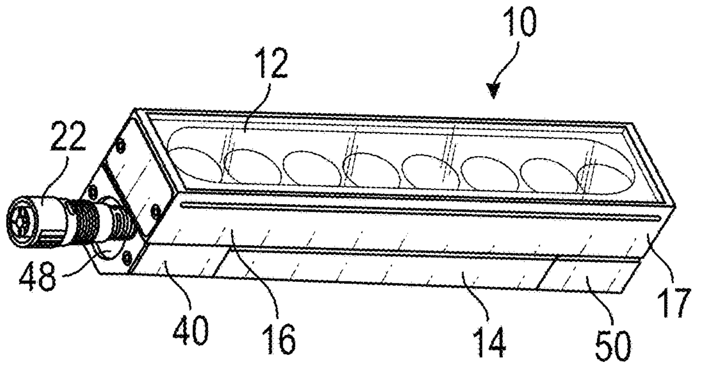
FIG. 5 is a perspective view of the light fixture module of FIG. 4, showing the cover assembly and shroud assembly installed thereon.

Attention is advanced to FIG. 4 in this regard. FIG. 4 illustrates a mode, according to the present invention, for protectively and aesthetically covering the respective junction spaces 30, 32 of a single module body 10. It is desirable and possible to apply the present invention to a single module body 10, such as the module body described hereinabove. There is provided a cover assembly 40 connectable to the module body 10 to at least partially enclose the first junction space 30. There also is provided a separate shroud assembly 50 connectable to the module body 10 to at least partially enclose the second junction space 32. After the cover assembly 40 and the shroud assembly 50 have been installed upon the respective ends of the module body 10, the completed configuration appears as seen in FIG. 5. While the visual appearance of the overall luminaire has been enhanced, the respective junction spaces 30, 32 have also been covered.

It is seen in FIGS. 4 and 5 that the first cable coupler 22 remains partially uncovered to permit its mechanical and electrical connection to another coupler, cable, or power source as may be needed. Again, the first cable coupler 22 normally is an electrical cable distending from the first end 23 of the second module portion 14 (of the module body) and through the first junction space 30. Nevertheless, the first junction space 30 is well covered, its substantially complete enclosure (e.g., at least 60% of the space 30 is surrounded) subject only to a cable passage aperture 48 allowing the extension of the first cable coupler 22 from the space 30. In FIG. 5, the second junction space 32 is enclosed substantially fully (e.g., at least 95% of the space 32 is surrounded) by the shroud assembly 50.

Figure 6:
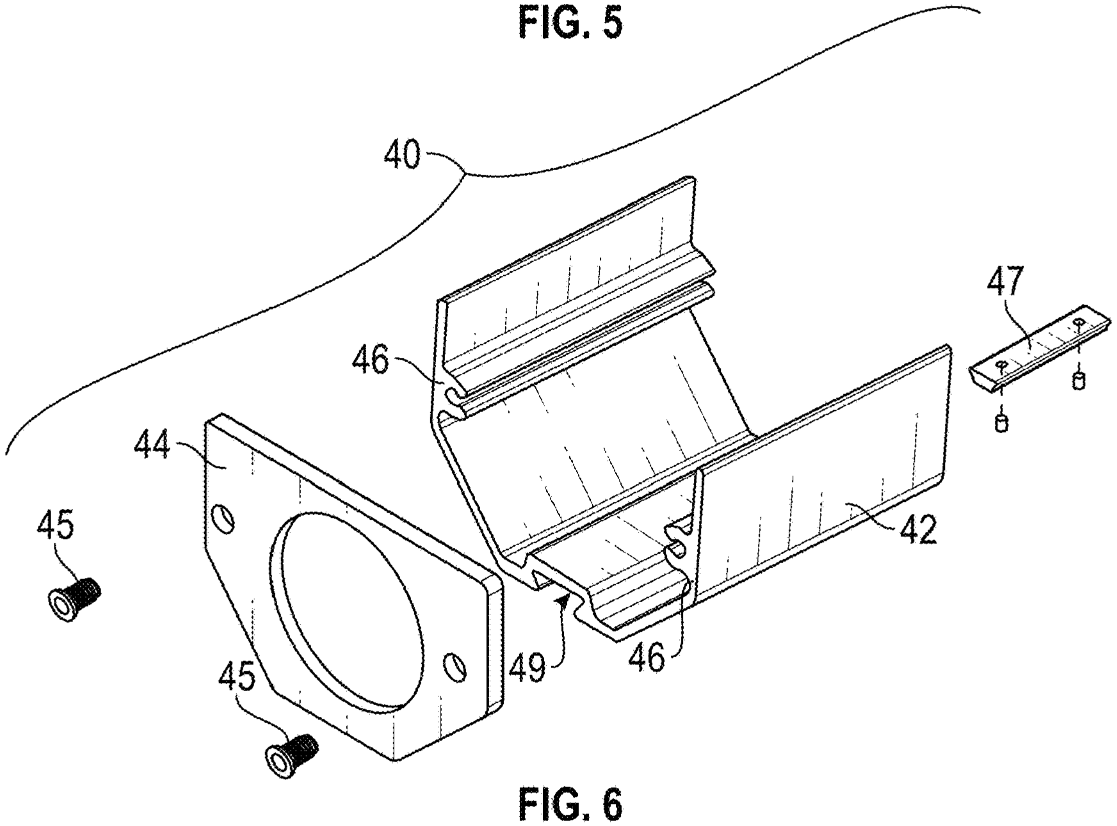
FIG. 6 is an exploded perspective view of a cable cover assembly according to the present invention.
Figure 7:
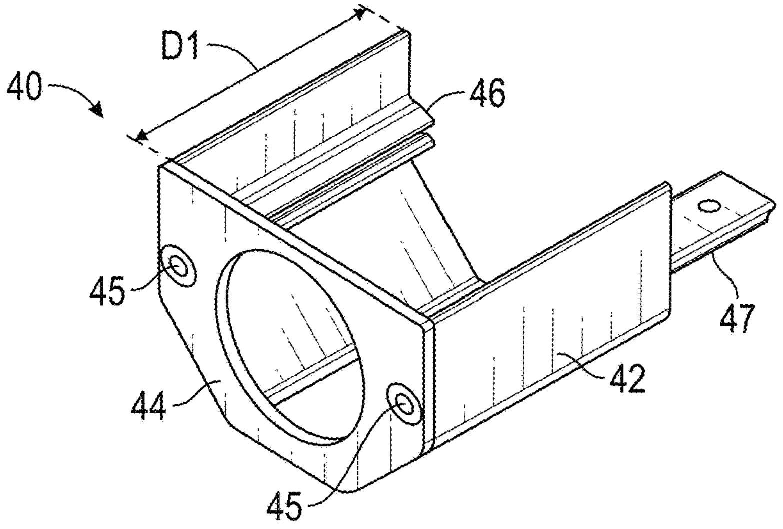
FIG. 7 is a perspective view of the cover assembly seen in FIG. 6, as assembled for use.
Figure 8A:
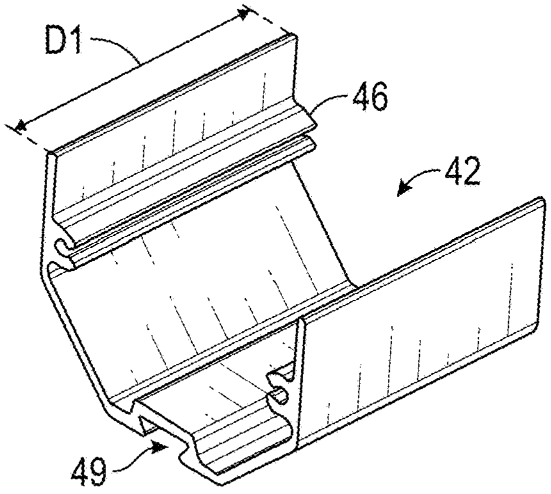
FIG. 8A is a perspective view of a cable cover, or of a shroud, in accordance with the present invention.
Figure 8B:
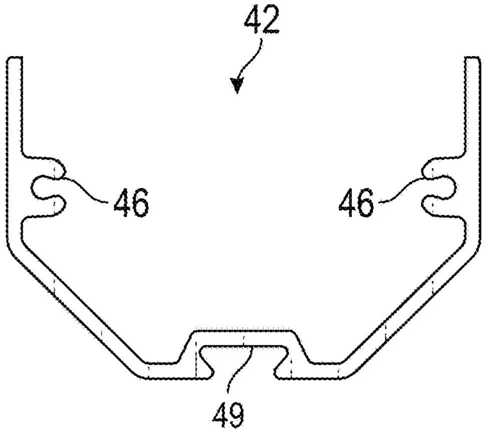
FIG. 8B is an end view of the cable cover or shroud seen in FIG. 8A.
Figure 9:
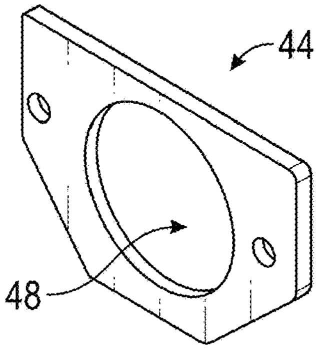
FIG. 9 is an enlarged perspective view of an end plate of a cover assembly.

FIGS. 6 and 7 illustrate an exploded view and an assembled view, respectively, of a cover assembly 40 possible according to the present invention. It is used on a first end of the module body 10. Cover assembly 40 may include three primary components and associated fasteners. Components of the cover assembly may include a cable cover 42 having a longitudinal dimension D1 approximately equal (i.e., ±4 mm) to the distance d1 (FIG. 2) that the first protuberance 16 extends beyond the first end 26 of the second module portion 14, as seen, for example, in FIGS. 4 and 7. The cable cover 42 is shown with additional detail in FIGS. 8A and 8B. The cover 42 may be fabricated from an extruded aluminum alloy. Also included in the cover assembly 40 is an end plate 44 attachable on an open proximate end of the cable cover 42. The end plate 44 is isolated in FIG. 9. When the assembled cover assembly 40 is connected to the module body 10 as seen in FIG. 5, an open distal end of the cable cover 42 abuts the first end 23 of the second module portion 14 of the module body. In combination, therefore, the cable cover 42 and end plate 44 thereby at least partially enclose the first junction space 30. A third component of a cover assembly 40 may be a peg 47, seen in FIGS. 6 and 7, and usable for connecting the cover assembly 40 to the module body, as shall be further described.

The cover assembly 40 may include some means for attaching the end plate 44 to the proximate end of the cable cover 42. The means of attachment can be any that is suitable and known in the art, including adhesives, soldering, spot welding or brazing, or mechanical fasteners such as screws or pins. For example, and as seen in FIGS. 6 and 7, a means for attaching preferably may include connectors 45 (such as screws) disposable through corresponding holes in the end plate 44, and engageable into/with sockets 46 defined in the cable cover 42. Combined reference to FIGS. 4-7, and FIG. 9, discloses how the end plate 44 defines therein an aperture 48 therein through which the cable 22 passes when the cover assembly 40 is connected to the module body 10.

Figure 10A:
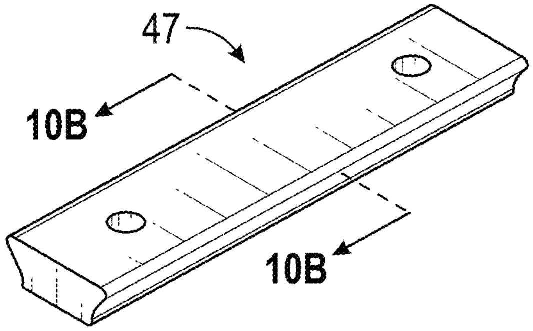
FIG. 10A is a perspective view of a peg usable in the present invention.
Figure 10B:
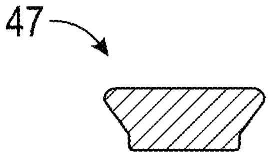
FIG. 10B is a cross-sectional view, taken at section B-B of FIG. 10A, of the peg seen in FIG. 10A.

The attachment peg 47 seen in FIGS. 10A and 10B is a part of a means for connecting the cover assembly 40 to the first end of the module body 10. Attention is invited to FIGS. 4, 6 and 7. A possible means for releasably connecting the cover assembly 40 to the module body 10 includes a module channel 19 (FIGS. 3 and 4) defined in a surface of the second module portion 14, a cover channel 49 (FIGS. 8A-B) defined in a surface of the cable cover 42 and alignable with the module channel 19, and the peg 47 insertable into both the module channel and the cover channel. The cross sectional shape and concave contours of the channels 19, 49 are complementary to the cross sectional shape and exterior contours of the attachment peg 47 (FIG. 10B). Accordingly, the peg 47 is slidably, perhaps somewhat frictionally, inserted into both channels 19, 49 so as to span the junction gap between the cable cover 42 and the module body 10, thus to interconnect them. This connection can be secured using an adhesive in combination with the peg 47. More preferably, temporary but reliable security is provided by mechanical fasteners such as set screws 41 (most preferably grub screws or blind screws) disposable through corresponding holes (e.g., seen in FIG. 6) in the attachment peg 47 and turnable against engagement surfaces inside the module channel 19 and the cover channel 49, respectively. With the peg 47 situated coaxially within the channels 19, 49 and secured therein, the cover assembly 40 is releasably connected to the module body 10 in the manner indicated by FIGS. 4 and 5.

Figure 11:
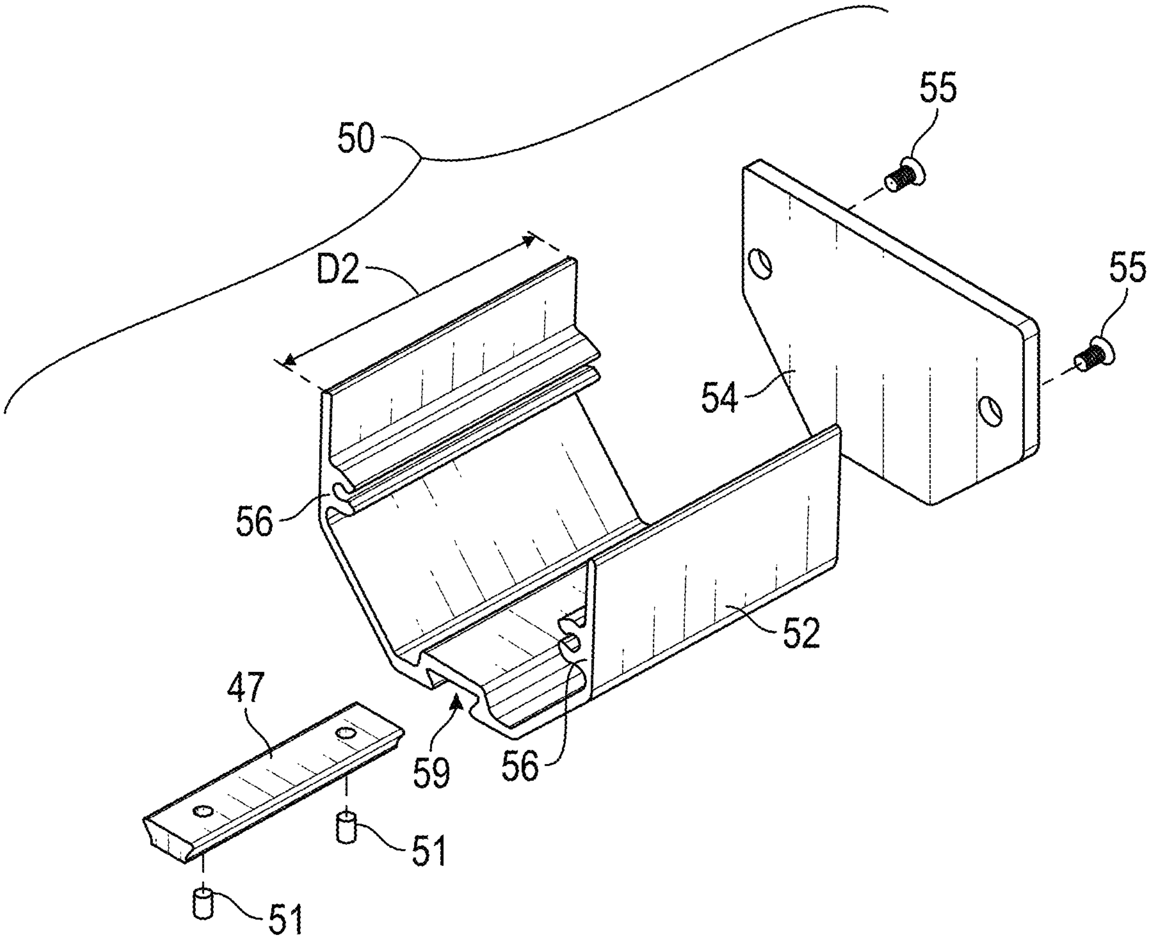
FIG. 11 is an exploded perspective view of a shroud assembly according to the present invention.
Figure 12:
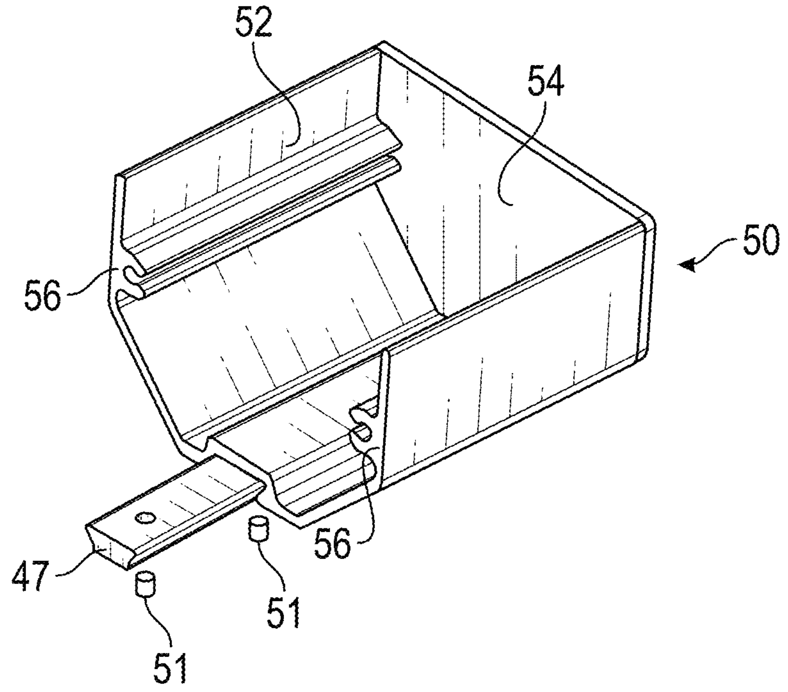
FIG. 12 is a perspective view of the shroud assembly seen in FIG. 11, as assembled for use.
Figure 13:
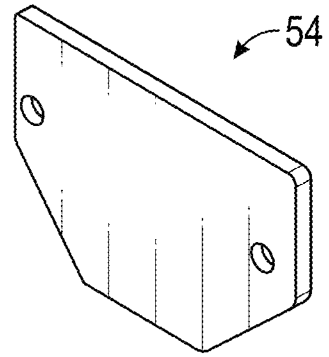
FIG. 13 is an enlarged perspective view of a cap of a shroud assembly.

There is a similar need to cover the second junction space 32 at the other, second, end of the module body 10. To this end there is provided a shroud assembly 50 as seen in FIGS. 11 and 12. The shroud assembly 50 is adapted to cover an end of a module assembly 10 that is not to be electrically or mechanically connected to another (second) module assembly. In such a context, there is no need for a connection to the second cable coupler 26, and thus the second junction space 32 can be substantially completely enclosed. In a preferred embodiment, a shroud assembly 50 includes a shroud 52 having a longitudinal dimension D2 (FIG. 11) approximately equal (i.e., ±4 mm) to the distance d2 (FIG. 2) that the second protuberance 17 extends beyond the second end 27 of the second module portion 14 of the module body. It is recognized that the shroud 52 may be configured very similarly to, and of the same composition (such as an extruded alloy), as the cable cover 42 detailed in FIGS. 8A-B. (Typically, the length dimension D2 of the shroud 52 is equal to the length dimension D1 of the cable cover 40; but in selected alternative embodiments, customized to particular design configurations, i.e., D1≠D2.) The shroud assembly 50 also includes a cap 54 that is attachable to an open proximate end of the shroud 52, as indicated in FIGS. 11 and 12. The planar cap 54 is illustrated in isolation in FIG. 13, and is seen to correspond generally in shape and size to the cable cover 42, except that the cap 54 is not penetrated by a cable aperture 48. When the assembled shroud assembly 50 is connected to the module body 10 (e.g., FIG. 5) an open distal end of the shroud 52 abuts the second end 27 of the second module portion 14, and the shroud 52 and cap 54 thereby at least partially enclose the second junction space 32. In the preferred embodiment seen in FIGS. 4-5 and 12, the second junction space 32 is substantially fully enclosed.

There is also provided a means for attaching the cap 54 to the proximate end of the shroud 52. One preferred such means for attaching is connectors 55, such as screws, disposable through corresponding holes through the cap 54 and engageable into sockets 56 defined in the shroud 52, as indicated by FIG. 11. Reference is had to FIG. 12, as well as helpful discussion of the attaching means for the end plate 44 to the cable cover 42 discussed previously.

Another component of a shroud assembly 50 may be another peg 47, seen in FIGS. 11 and 12, and useable for releasably connecting the shroud assembly 50 to an end of the module body 10. The peg 47 is seen in FIGS. 10A-B, and is the same or substantially similar to the peg used to connect the cover assembly 40 to the other end of the module body 10. Thus one possible means for releasably connecting the shroud assembly 50 to the module body 10 includes the module channel 19 defined in a surface of the second module portion 14, a shroud channel 59 defined in a surface of the shroud 52 and alignable with the module channel, and a (e.g., second) peg 47 insertable into the module channel 19 and the shroud channel 59.

Again, the cross sectional shape and concave contours of the channels 19, 59 are complimentary to the cross sectional shape and exterior contours of the attachment peg 47. Accordingly, the peg 47 is slidably, perhaps frictionally, insertable into both channels 19, 59 so as to span the junction gap between the shroud 52 and the module body 10, thereby interconnecting them. This connection can be secured using an adhesive in combination with the peg 47. But as with the cover assembly 40, mechanical fasteners preferably are used to secure the peg 47 in the channels 19, 59. Again, security may be provided by set screws 51 (such as grub screws) disposable through corresponding holes (e.g., seen in FIGS. 10A and 11) in the attachment peg 47 and screwably contactable against engagement surfaces inside the module channel 19 and inside the shroud channel 59 respectively. With the peg 47 situated coaxially within the channels 19, 59 and secured therein, the shroud assembly 50 is releasably connected to the module body 10 in the manner suggested by FIGS. 4 and 5. When the assembled shroud assembly 50 is thereby connected to the module body 10, the shroud 52 and cap 54 may fully enclose the second junction space 32.

The present invention also has beneficial application in the connection of two or more module bodies 10. Such connections are both mechanical and electrical in nature. By joining together a plurality of module bodies, e.g., end-to-end, complex luminaire lighting systems can be configured for use. For example, two or more module bodies 10 may be arranged linearly to compose a long lighting feature that has the appearance and function of a single elongated luminaire.

With all the discussion hereinabove as informative background, attention is advanced to FIGS. 14 and 15. For purposes of disclosure, and simplicity of illustration, the interconnection of two module bodies 10 is shown and described. Nevertheless, a person skilled in the art readily understands that the modes, manners, and concepts of the invention may be harnessed operatively to interconnect a series of two, three, or more module bodies 10.

In a system having at least two interconnected module bodies 10, there is a first module body 10 with a first end 71 and a second end 72, and a second module body 10' with a first end 75 and a second end 76. Each of the module bodies 10 and 10' defines a respective first junction space 30 and second junction space 32, in accordance with discussions previously above. In the system of FIGS. 14 and 15, there is provided an intermediate sheath 80. The intermediate sheath 80 has a cross-sectional configuration in accordance with FIGS. 8A and 8B, but it ordinarily with have an axial length longer than either the length dimensions D1, D2 of the cover assembly 10 or the shroud assembly 50. The sheath 80 may be an extrusion fabrication.

In the assembly of the two module bodies 10, 10', the first end 75 of the second module body 10' is abuttable or abutted against the second end 72 of the first module body 10. As best indicated by FIG. 15, the intermediate sheath 80 has an overall longitudinal dimension approximately equal (i.e., ±6 mm) to the distance the second protuberance 84 of the first module body 10 extends beyond the second end 27 (see 27 of FIG. 2) of first module body's 10 second module portion 14 plus the distance the first protuberance 86 of the second module body 10' extends beyond the first end 23 (see 23 of FIG. 2) of the second module body's 10' second module portion 14'. As also disclosed by reference to FIGS. 14 and 15, the second junction space 32 of the first module body 10 and the first junction space 30 of the second module body 10' are jointly coverable with the intermediate sheath 80 when the two modules are brought together.

Informed by the discussion previously elaborated respecting the single module body embodiment of this disclosure (FIGS. 1-13), it is understood that pegs 47 may be used, with an intermediate sheath 80, to connect together the two module bodies 10, 10'. Essentially the same means is used for connecting the first module body 10 to the second module body 10', except the intermediate sheath 80 interconnects the module bodies using a pair of pegs 47. Thus, an intermediate channel 89 (like channel 49 seen in FIGS. 8A-B) is defined in a surface of the intermediate sheath 80. A first module channel 19' (like the channel 19 shown in FIG. 3) is defined in a surface of the first module body's second module portion 14, which channel is alignable with the intermediate channel 89 on the intermediate sheath 80. A peg (i.e., third peg 47') is insertable into the aligned first module channel 19' and the intermediate channel 89. A second module channel 19" (like the channel 19 shown in FIG. 4) is defined in a surface of the second module body's second module portion 14', and is alignable with the intermediate sheath's channel 89 (i.e., at the other end of the intermediate channel). Another peg 47 (i.e., fourth peg 47") is insertable into the aligned second module channel 19" (of the second module body 10') and the intermediate channel 89. Temporary security of the pegs 47', 47" may be provided using set screws 41 through the pegs and engaged with channel surfaces, in the manner interconnecting previously described.

Figure 14:
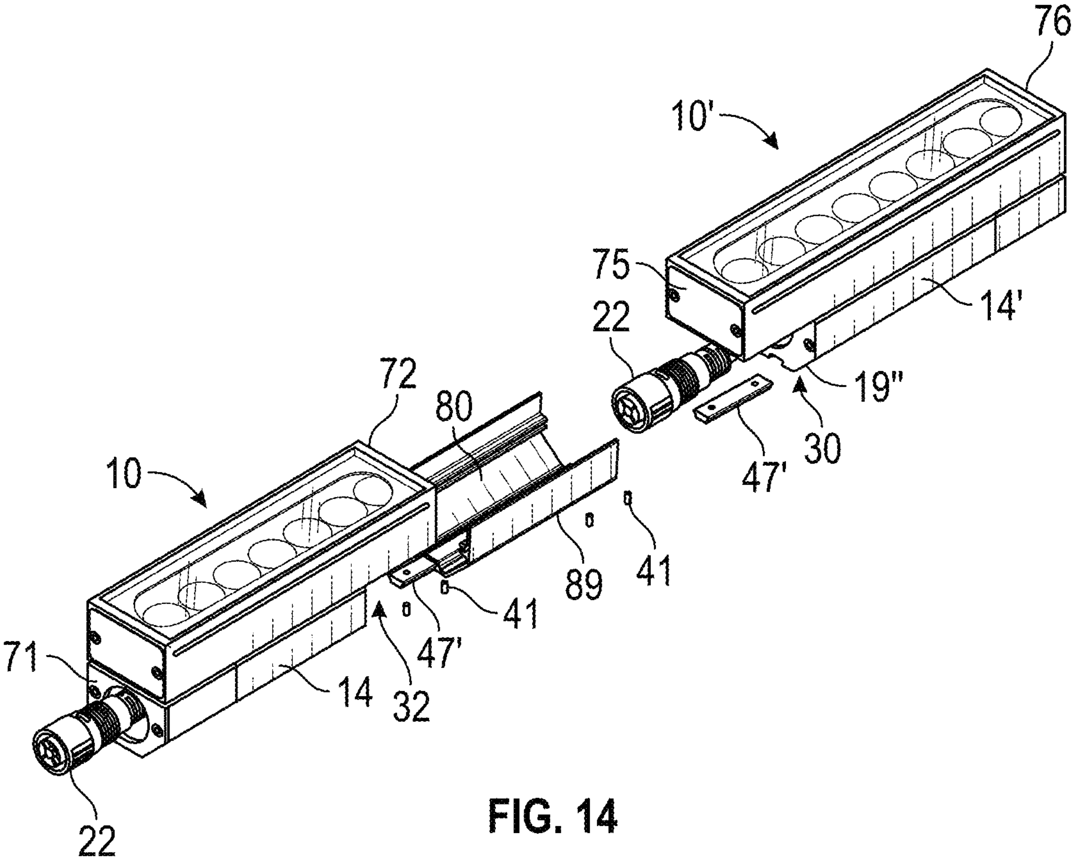
FIG. 14 is a partially exploded perspective view illustrating the use of an intermediate sheath for connecting together two module bodies and to cover and protect their adjacent junction spaces.
Figure 15:
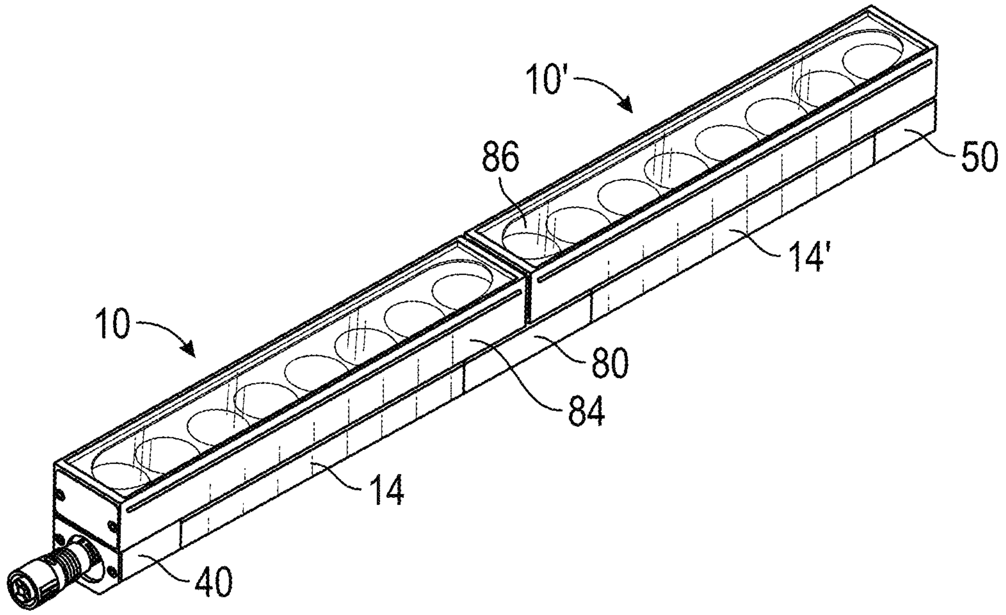
FIG. 15 shows two module bodies aesthetically connected in accordance with the present invention.

The mode and manner of the interconnection of the module bodies 10, 10' with the intermediate sheath 80 as seen in FIG. 14 is readily apparent from the foregoing. The second end 72 of the first module body 10 is brought to abutting adjacency with the first end 75 of the second module portion 10', and the two pegs 47' and 47" are installed in respective ones of the coaxially aligned channels 19', 19" and 89, thereby forming the assembled whole illustrated in FIG. 15. It is seen in FIGS. 14 and 15 that a cover assembly 40 is connectable to the first module body 10 to at least partially enclose its first junction space, while a shroud assembly 50 is connectable to the second module body 10' to at least partially enclose its respective second junction space. The first cable coupler 22 (e.g., per FIG. 2) of each of the first module body 10 and the second module body 10' may be a cable distending from the first end of the respective module body's second module portion (14 or 14') and through its first junction space 30 (also per FIG. 2), while the second cable coupler 26 of each of the first module body 10 and the second module body 10' may be a connection inlet (e.g., per FIG. 3) in the second end of the respective module body's second module portion 14 or 14'. A first cable coupler 22 in any second module body 10' is complementary and engageable to a second cable coupler 26 of an a selected first, adjacent, module body 10 to supply an electrical transmission between the module bodies. Thus, when the first module body 10 is connected to the second module body 10', the cable 22 distending from the first end 75 of the second module 10' is electrically connectable with the connection inlet 26 in the second end 72 of the first module 10. FIG. 15 highlights the aesthetically pleasing combination of the module bodies 10, 10' into a visually integrated luminaire.

Although the invention has been described in detail with particular reference to these preferred embodiments, other embodiments can achieve the same results. In this description, specific details are set forth, such as specific materials, structures, processes, etc., in order to provide a thorough understanding of the present invention. However, as one having ordinary skill in the art of LED lighting fixtures would recognize, the present invention can be practiced without resorting strictly only to the details specifically set forth. In other instances, well-known concepts and compositions have not been described in detail, in order not to unnecessarily obscure the present invention.

Only some embodiments of the invention and but a few examples of its versatility are described in the present disclosure. It is understood that the invention is capable of use in various other combinations and is capable of changes or modifications within the scope of the inventive concept as expressed herein. Modifications of the invention will be obvious to those skilled in the art and it is intended to cover by the appended claims all such modifications and equivalents.

We claim:

1. A modular lighting system including at least one elongated module body, each of the at least one module bodies having: a first module portion and a second module portion parallelly adjacent the first module portion, the second module portion having a first cable coupler at a first end thereof and a second cable coupler in a second end thereof, wherein the first module portion comprises a first protuberance extending longitudinally beyond the first end of the second module portion and a second protuberance extending longitudinally beyond the second end of the second portion, there being a first junction space defined in part by the first protuberance and the first end of the second module portion, and there being a second junction space defined in part by the second protuberance and the second end of the second module portion; and further comprising:

a cover assembly connectable to the at least one module body to at least partially enclose the first junction space; and a shroud assembly connectable to the at least one module body to at least partially enclose the second junction space.

2. The system of claim 1 wherein the cover assembly comprises:

a cable cover having a longitudinal dimension approximately equal to the distance the first protuberance extends beyond the first end of the second module portion; and an end plate attachable an open proximate end of the cable cover;

wherein when the assembled cover assembly is connected to the module body, an open distal end of the cable cover abuts the first end of the second module portion, the cable cover and end plate thereby at least partially enclosing the first junction space.

3. The system of claim 2 further comprising means for attaching the end plate to the proximate end of the cable cover.

4. The system of claim 3 wherein the means for attaching comprises connectors disposable through holes in the end plate and engageable into sockets defined in the cable cover.

5. The system of claim 2 wherein the first cable coupler comprises an electrical cable distending from the first end of the second module portion and through the first junction space.

6. The system of claim 5 wherein the end plate defines therein an aperture therein through which the cable passes when the cover assembly is connected to the module body.

7. The system of claim 2 further comprising means for connecting the cover assembly to the module body, comprising:

a module channel defined in a surface of the second module portion;

a cover channel defined in a surface of the cable cover and alignable with the module channel; and a peg insertable into the module channel and cover channel.

8. The system of claim 1 wherein the shroud assembly comprises:

a shroud having a longitudinal dimension approximately equal to the distance the second protuberance extends beyond the second end of the second module portion; and a cap attachable an open proximate end of the shroud;

wherein when the assembled shroud assembly is connected to the module body, an open distal end of the shroud abuts the second end of the second module portion, the shroud and cap thereby at least partially enclosing the second junction space.

9. The system of claim 8 further comprising means for attaching the cap to the proximate end of the shroud.

10. The system of claim 9 wherein the means for attaching comprises connectors disposable through holes in the cap and engageable into sockets defined in the shroud.

11. The system of claim 8 wherein the second cable coupler comprises a connection inlet in the second end of the second module portion.

12. The system of claim 8 further comprising means for connecting the shroud assembly to the module body, comprising:

a module channel defined in a surface of the second module portion;

a shroud channel defined in a surface of the shroud and alignable with the module channel; and a second peg insertable into the module channel and shroud channel.

13. The system of claim 12 wherein when the assembled shroud assembly is connected to the module body, the shroud and cap fully enclose the second junction space.

14. The system of claim 1 comprising a first module body with a first end and a second end, and a second module body with a first end and a second end, each of the module bodies defining a first junction space and a second junction space, and further comprising an intermediate sheath, wherein:

the first end of the second module body is abuttable against the second end of the first module body;

the intermediate sheath has a longitudinal dimension approximately equal to the distance the second protuberance of the first module body extends beyond the second end of first module body's second module portion plus the distance the first protuberance of the second module body extends beyond the first end of second module body's second module portion;

the second junction space of the first module body and the first junction space of the second module body are jointly coverable with the intermediate sheath.

15. The system of claim 14 further comprising means for connecting the first module body to the second module body, the means comprising:

an intermediate channel defined in a surface of the intermediate shroud;

a first module channel defined in a surface of the first module body's second module portion and alignable with the intermediate channel;

a third peg insertable into the aligned first module channel and intermediate channel;

a second module channel defined in a surface of the second module body's second module portion and alignable with the intermediate channel; and a fourth peg insertable into the aligned second module channel and intermediate channel.

16. The system of claim 14 wherein the cover assembly is connectable to the first module body to at least partially enclose its first junction space, and the shroud assembly is connectable to the second module body to at least partially enclose its second junction space.

17. The system of claim 15 wherein:

the first cable coupler of each of the first module body and the second module body comprises a cable distending from the first end of the respective module body's second module portion and through its first junction space; and the second cable coupler of each of the first module body and the second module body comprises a connection inlet in the second end of the respective module body's second module portion.

18. The system of claim 17 wherein when the first module body is connected to the second module body, the cable distending from the first end of the second module body's second module portion is electrically connectable with the connection inlet in the second end of the first module body's second module portion.

19. A modular lighting system including at least one elongated module body, each of the at least one module bodies having: a first module portion and a second module portion parallelly adjacent the first module portion, the second module portion having a first cable coupler at a first end thereof and a second cable coupler in a second end thereof, wherein the first module portion comprises a first protuberance extending longitudinally beyond the first end of the second module portion and a second protuberance extending longitudinally beyond the second end of the second portion, there being a first junction space defined in part by the first protuberance and the first end of the second module portion, and there being a second junction space defined in part by the second protuberance and the second end of the second module portion; and further comprising a cover assembly connectable to the at least one module body to at least partially enclose the first junction space, the cover assembly comprising:

a cable cover having a longitudinal dimension approximately equal to the distance the first protuberance extends beyond the first end of the second module portion; and an end plate attachable an open proximate end of the cable cover;

wherein when the assembled cover assembly is connected to the module body, an open distal end of the cable cover abuts the first end of the second module portion, the cable cover and end plate thereby at least partially enclosing the first junction space.

20. The system of claim 19 further comprising a shroud assembly connectable to the at least one module body to at least partially enclose the second junction space, the shroud assembly comprising:

a shroud having a longitudinal dimension approximately equal to the distance the second protuberance extends beyond the second end of the second module portion; and a cap attachable an open proximate end of the shroud;

wherein when the assembled shroud assembly is connected to the module body, an open distal end of the shroud abuts the second end of the second module portion, the shroud and cap thereby at least partially enclosing the second junction space.

21. A modular lighting system including at least one elongated module body, each of the at least one module bodies having: a first module portion and a second module portion parallelly adjacent the first module portion, the second module portion having a first cable coupler at a first end thereof and a second cable coupler in a second end thereof, wherein the first module portion comprises a first protuberance extending longitudinally beyond the first end of the second module portion and a second protuberance extending longitudinally beyond the second end of the second portion, there being a first junction space defined in part by the first protuberance and the first end of the second module portion, and there being a second junction space defined in part by the second protuberance and the second end of the second module portion; and further comprising a shroud assembly connectable to the at least one module body to at least partially enclose the second junction space.

* * * * *